United States Patent
Utard et al.

(10) Patent No.: US 7,779,128 B2
(45) Date of Patent: Aug. 17, 2010

(54) SYSTEM AND METHOD FOR PERENNIAL DISTRIBUTED BACK UP

(75) Inventors: Gil Utard, Boves (FR); Cyril Randriamaro, Picquigny (FR)

(73) Assignee: Universite de Picardie Jules Verne, Amiens (FR)

( * ) Notice: Subject to any disclaimer, the term of this patent is extended or adjusted under 35 U.S.C. 154(b) by 352 days.

(21) Appl. No.: 11/805,559

(22) Filed: May 22, 2007

(65) Prior Publication Data

US 2008/0005334 A1    Jan. 3, 2008

Related U.S. Application Data

(63) Continuation of application No. PCT/FR2005/002876, filed on Nov. 18, 2005.

(30) Foreign Application Priority Data

Nov. 26, 2004   (FR)   .................... 04 52788

(51) Int. Cl.
   *G06F 15/173* (2006.01)
(52) U.S. Cl. ................... 709/226; 709/228; 370/256
(58) Field of Classification Search ................. 709/223, 709/228; 370/256
   See application file for complete search history.

(56) References Cited

U.S. PATENT DOCUMENTS

| | | | |
|---|---|---|---|
| 2002/0114341 | A1 | 8/2002 | Sutherland et al. |
| 2004/0049700 | A1 | 3/2004 | Yoshida |
| 2004/0064693 | A1 | 4/2004 | Pabla et al. |
| 2005/0015511 | A1* | 1/2005 | Izmailov et al. ............. 709/238 |
| 2005/0240591 | A1* | 10/2005 | Marceau et al. ................ 707/9 |
| 2005/0243740 | A1* | 11/2005 | Chen et al. ................... 370/256 |
| 2006/0168154 | A1* | 7/2006 | Zhang et al. ................ 709/220 |

FOREIGN PATENT DOCUMENTS

WO   WO 02/063484   8/2002

OTHER PUBLICATIONS

Bolosky, William J. et al.; "Feasibility of a Serverless Distributed File System Deployed on an Existing Set of Desktop PCs"; Performance Evaluation Review; vol. 28, No. 1, XP-002344594; Jun. 2000; pp. 34-43.

(Continued)

*Primary Examiner*—Hassan Phillips
*Assistant Examiner*—Glenford Madamba
(74) *Attorney, Agent, or Firm*—Harness, Dickey & Pierce, P.L.C.

(57)   ABSTRACT

The invention relates to computer networks and to a digital data protection thereon, in particular to a method for the distributed backup of a digital data block (B) in an computer network comprising a DHT distributed hash table and at least one node NO, wherein said NO nodes are connected to said network. The inventive method consists in dividing said block B into digital data r fragments F, in storing the fragment F in the $NO_F$ resource memories, in recording couples (block B, node $NO_F$) and (node $NO_F$, fragment F) in the DHT parts contained in at least two nodes and in a centralised server when no operation on the DHT or storage operation is carried out during said process.

14 Claims, 10 Drawing Sheets

OTHER PUBLICATIONS

Adya, Atul, et al.; "FARSITE: Federated, Available, and Reliable Storage for an Incompletely Trusted Environment"; USENIX Association/Proceedings of the Fifth Symposium on Operating Systems Design and Implementation; XP-002344595; 2002; pp. 1-14.

Muthitacharoen, Athicha et al.; "Ivy: A Read/Write Peer-to-Peer File System"; USENIX Association/Proceedings of the Fifth Symposium on Operating Systems Design and Implementation; XP-002344596; 2002; pp. 31-44.

* cited by examiner

SYSTEM AND METHOD FOR PERENNIAL DISTRIBUTED BACK UP

CROSS-REFERENCE TO RELATED APPLICATIONS

This application is a continuation of PCT/FR2005/002876, filed Nov. 18, 2005, which claims priority to French Application No. 04/52788, filed Nov. 26, 2004. Both of these applications are incorporated by reference herein.

BACKGROUND AND SUMMARY

The present invention relates to the field of computer networks and to the backup of digital data in such networks.

The present invention relates more particularly to a method, a system, and a device for the distributed backup of data in a network that does not include a server dedicated to backup operations. The invention proposed distributes the backup tasks over a set of storage elements connected to the network, while also implementing mechanisms for persistently preserving the control and check data and the stored digital data. The aim is to create a peer-to-peer network in which many terminals connected to the Internet join forces to provide a perennial storage service. Each microcomputer acts as a storage peripheral. If the microcomputer fails, is stolen, or is damaged, the information stored will be retrievable even if said microcomputer is replaced with a new one.

In the prior art, US Patent Application US 2004/0 049 700 (Takeo Yoshida) discloses an inexpensive data storage method using available capacity in personal computers (PCs) connected to the network. When a backup client of a user PC receives a backup instruction for a file from a user, the backup client requests backup to a backup control server. The backup control server divides and encrypts the file to be backed up into a plurality of encrypted pieces, transfers the encrypted pieces to user PCs, and stores the encrypted pieces in the hard disk drives (HDDs) of the user PCs. When the distributively backed up file is to be extracted, the user PC obtains each of the encrypted pieces from the user PCs on which they are stored, and combines and decrypts the encrypted pieces to restore the original file.

That proposed solution is to distribute data storage by dispersing the data over a set of peripherals connected to the network. However, that system requires high availability of the peripherals, or at least that they be activatable remotely, in order to access the data. The other drawback of that system is that it does not make it possible to overcome failure of the storage peripherals, and loss of data on a storage peripheral is irremediable. Finally, that system is not scalable because storage is coordinated by a server via which all of the data passes.

Also in the prior art, PCT Patent Application WO 02/063 484 (SS8 Networks) discloses a distributed data storage system whose architecture is highly available and highly scalable. In one embodiment of that invention, the distributed data storage system includes a plurality of data storage units that are controlled by an object management system. The object management system selects the distributed data storage units for performing the file access requests according to the external inputs/outputs with which the file access requests are associated. In response to a file creation request that is associated with an external input of one distributed data storage unit, the object management system preferentially creates a data file in that distributed data storage unit. In response to a file retrieval request that is associated with a data file and with an external output of a distributed data storage unit, the object management system preferentially returns a hostname and a pathname of a copy of the data file that is stored within that distributed data storage unit. The object management system also makes redundant copies of the data files in different units to provide high availability of data. In that patent application, the system performs redundant distributed storage that nevertheless requires a centralized management system that can be likened to a management server. That proposed solution is not viable without the presence of such a server, which makes it extremely dependent on the server operating properly.

US Patent Application US 2002/0 114 341 (Andrew Sutherland et al.) also discloses a peer-to-peer storage system including a storage coordinator that centrally manages distributed storage resources in accordance with system policies administered through a central administrative console. The storage resources are otherwise unused portions of storage media, e.g. hard disks, that are included in the devices such as personal computers, workstations, laptops, file servers, and so forth, that are connected to a computer network. That patent application proposes distributed storage in a network requiring the presence of a storage coordinator, i.e. a sort of server, that distributes the data to be stored to the various devices or nodes of the network.

Similarly, US Patent Application US 2004/064 693 (Akhil K. Arora, et al.) discloses a distributed index mechanism for indexing and searching for identity information in peer-to-peer networks. A distributed index, of the distributed hash table (DHT) type may be used to store identity information in a decentralized manner on a plurality of peer nodes. The identity information may be used, for example, to authenticate users. Distributed indexes may allow identity information to be spread across multiple peer nodes so that the load is spread among the various peer nodes. That patent application proposes using the DHT to put in place a distributed identification mechanism (for identifying users or for some other identification purpose). The peers of a DHT are made active (by requests for authentication information) so as not to restrict storage to mere passive storage, but the use of them does not go beyond that context and does not make it possible to detect failures on another node.

In the state of the art, peer-to-peer networks are also known that use DHTs, such as Chord, CAN, Pastry or Tapestry, for implementing distributed data storage. The use of DHTs in such networks offers a routing mechanism for routing between the peers via an overlay network or "overlay" that tolerates failures and that is more resistant to attacks related to the routing-overlay association. It also offers a dictionary that is distributed and redundant over the overlay: each input of the dictionary is made up of a key and of an associated object (e.g. a digital data file). The object is inserted into the DHT which replicates it over various nodes in order to guarantee a certain level of tolerance to failures. The use of the DHT also offers a logic organization for the data: a single identifier is assigned to each of the peers, ideally the identifiers are chosen such that they are as dispersed as possible in the space of the available names, and a function (e.g. identity) projects the space of the keys of the dictionary into the space of the names of the peers. On inserting a new object into the DHT dictionary, the peer that stores it is the peer that is reached by the routing algorithm as a function of the projected key of the object in the names space; in general, the routing algorithm designates the peer that has the identifier that is closest to the projection of the key. The inserted object is replicated by the DHT so as to overcome disappearance of peers. Typically, each peer maintains a list of peers that have "neighboring" (in the meaning of the routing algorithm) identifiers in the names space, the object is then duplicated over those peers. The known mechanisms associated with the DHTs make it possible to manage the data merely by primitives such as "search", "put", "get", "free", etc. Another limitation concerns the "cumbersomeness" of use of DHTs: they store the data, which considerably increases the traffic over the network when requests are transmitted.

An object of the present invention is to remedy the drawbacks of the prior art by proposing a method of distributed backup that distributes backup in a computer network, and that is based on the use of distributed hash tables for storing the control and check or storage management information in persistently perennial manner. The term "control and check or storage management information" is used to mean all of the data that is associated with the data to be stored, in the nodes of the network, and that is used during data storage or during data retrieval.

The method of the present invention copes particularly well with the problems of current computer networks: scaling the network by adding new nodes or by removing old nodes, security from attacks, data protection, redundancy of storage information, persistent preservation of data in the event of failures or defects. To this end, the invention provides, in its most general acceptation, A method for the distributed backup for backing up a block B of digital data distributively in a computer network including a distributed hash table DHT and at least three nodes NO, the nodes NO being connected to said network, said method comprising a subdivision step for subdividing said block B into r fragments F of digital data, said method being characterized in that it further comprises the following steps:

a storage step for storing a fragment F in the storage resources of a node $NO_F$; and a recording step for recording the pairs (block B, node $NO_F$) and (node $NO_F$, fragment F) in the portions of the DHT that are contained in at least two nodes;

and, during said method, no operation on the DHT or any storage operation is implemented on a centralized server.

In an implementation, after the subdivision step, said method further comprises a step of computing s redundancy fragments computed on the basis of said r fragments F. In a particular implementation, said fragments are stored, during the storage step, in nodes that are all different. Particularly, the DHT contains check data only, and no fragment of data.

In an implementation, said method further comprises a periodic sending step whereby each of said nodes periodically sends activity information to a set of nodes selected by the DHT. In an implementation, the DHT contains a "life cycle" field, and sending said activity information updates the "life cycle" field of said node, said field being present in every one of the nodes selected by the DHT. In a particular implementation, said method further comprises a detection step for detecting a "life cycle" field that is not updated by a node $C_{failed}$. Particularly, said method further comprises a reconstruction step for reconstructing the data stored in said failed node $C_{failed}$ and for updating, in the DHT, the list of the nodes storing at least one fragment of said block B.

In an implementation, each of the fragments reconstructed during said reconstruction step is stored in at least one other healthy node. In a particular embodiment, said method further comprises a recovery step for recovering said block B. Particularly, said recovery step comprises a first step of sending a request from the requesting node to the DHT, a second step in which the DHT sends back to it the nodes that are storing the fragments of the block, a step of sending a request for recovering fragments to said nodes, and a step of reconstructing the block B as of reception of F different fragments.

The invention also provides a distributed data backup device for implementing the method, said device comprising a processor, a storage memory, connection means for connecting to the network, and means for controlling the distributed data, of the distributed hash table DHT type. In an embodiment, said device is in the form of an external box that is added to an existing a computer workstation. The invention also provides a distributed backup system comprising at least two preceding devices connected together via a computer network. Particularly, said system comprises a plurality of devices connected to a plurality of interconnected networks.

BRIEF DESCRIPTION OF THE DRAWINGS

The invention can be better understood from the following description of an implementation of the invention given merely by way of explanation and with reference to the accompanying figures, in which.

DETAILED DESCRIPTION

The present invention proposes a method, a system, and a device for distributed and perennial peer-to-peer storage of data using the available hard disk space of the peers for storing therein the data of the users. The solution proposed makes it possible to propose a storage system that is independent of the robustness of the local components (typically the hard disks). The data is protected from accidental damage (fire) or from other damage (e.g. theft of the hardware).

The availability of the data is also guaranteed by the system which implements its replication process as soon as it is connected to the network. Real-time data backup and data availability are not guaranteed in most backup systems which make copies of the data to be protected at regular intervals (incremental-type backup on CD-ROMs or in networks). Persistent preservation is guaranteed by the fault tolerance properties implemented in particular by fragmenting the data and by adding redundancy, associated with a mechanism for detecting failures and for dynamically repairing the lost fragments.

Figure 1:
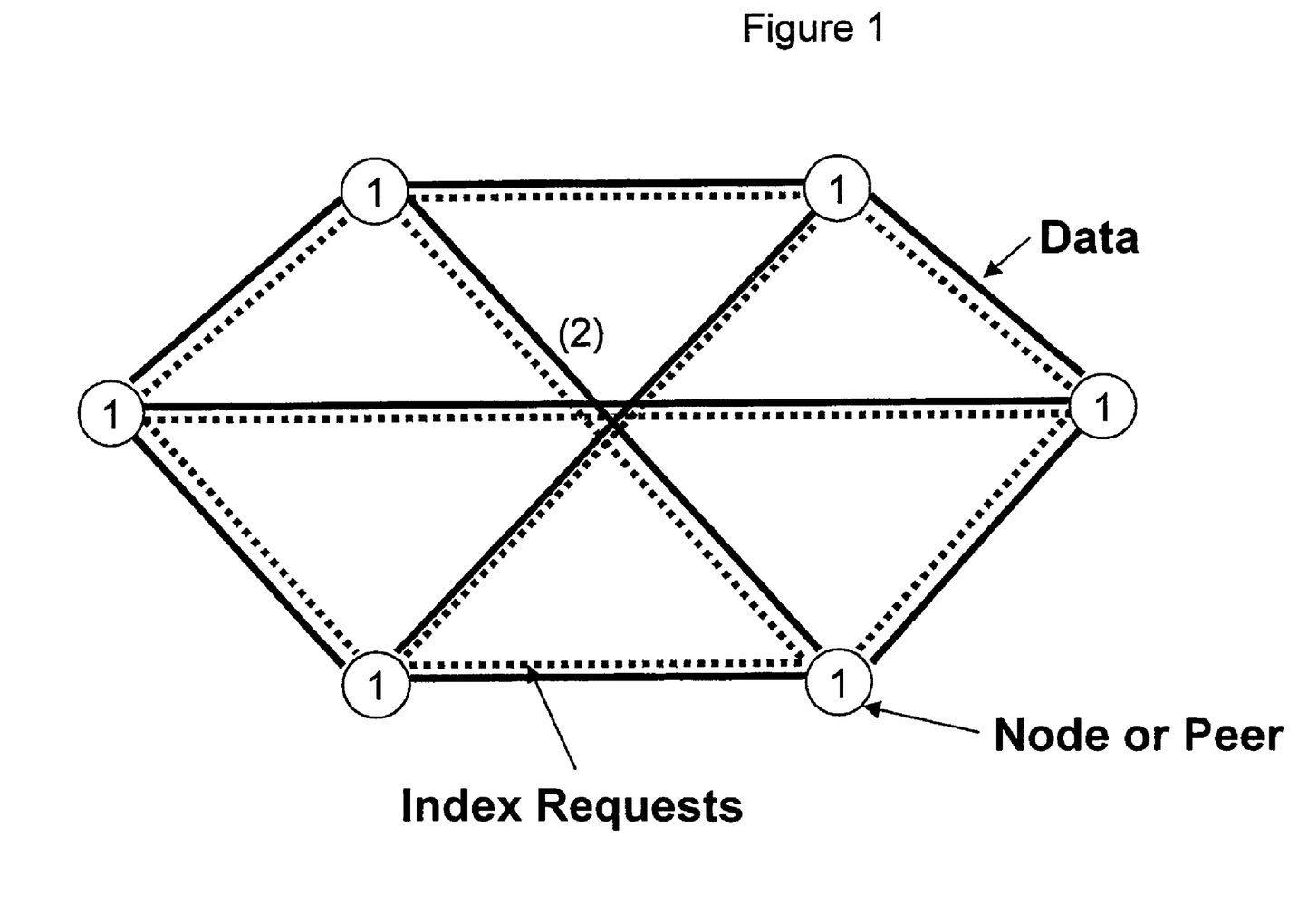
FIG. 1 shows the overall architecture of a peer-to-peer network of the present invention.

FIG. 1 shows the architecture of the peer-to-peer systems of the present invention. A plurality of peers (1) are connected to a network (2) constituting a mesh network. The digital data to be backed up can travel over all of the branches of the network. The check data (all of the information on management of the data stored in distributed manner) travel over the same network by means of a suitable mechanism: the DHTs mechanism as described in the prior art. Any request to the DHT is made via any path of the network in the same way as an item of data is sent over the network. The term "peer" is used to mean any node of the network, which node might merely be a computer. Peer-to-peer networks are based on equality between all of the nodes of the network, i.e. each of the computer workstations plays the same role as the others. This system does not have any server centralizing any storage management or operation. Certain servers dedicated to other tasks can be present in the network, without degrading operation of the invention: they are seen merely as peers of the network. The network (2) used can be merely a corporate network, but ideally it is the Internet. In which case, the present invention offers a globally distributed storage solution.

Figure 2:
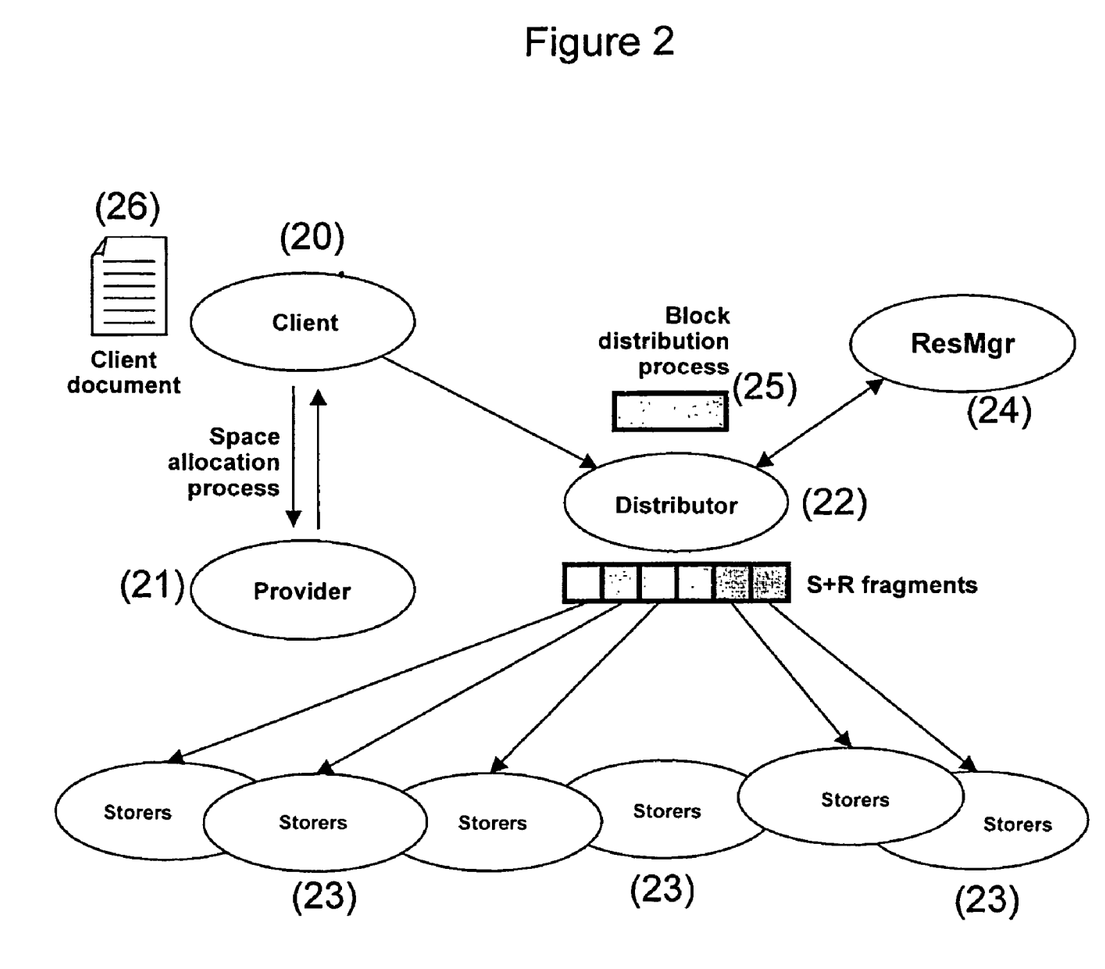
FIG. 2 shows the software architecture of the system.

FIG. 2 shows the software architecture of the system at a client workstation (node of the network). The system of the present invention is made up of two main entities: a client (20) who is a space seeker and a provider (21) who allocates and manages the space. The invention implements low-level storage: the system can be seen as a virtual hard disk. The client can be a specific file system (CFS, NFS, Fuse, etc.) interfaced with the network in order to enable the user to manage its data in the form of a file. The network of the present invention is interoperable with other storage systems, such as Internet Backplane Protocol (IBP), Past, etc.

For example, when a user sends its file (26) to the file system interfaced with the present invention, the file is subdivided into blocks (25) which are then sent to the distributor (22). The distributor possesses information on the available resources by interrogating the resources manager (24). The distributor subdivides the blocks into fragments including redundancy and error correction (Reed-Solomon) fragments. Finally, the distributor distributes the fragments to peers dedicated to storage, the "storers" (23), who locally back up the fragments.

Management of the shared storage space is thus based on three different applications:
the client (20) is the user interface for requesting storage of the blocks, for retrieving them, or for erasing them;
the distributor (22) is the service provider; it possesses and manages the information on the resources; and
the storer (23) is the peer that records the data in the form of fragments on the local hard disk.

All three applications are available to each of the nodes of the network since each of said nodes can play the role of requester or of storer.

The resources manager (24) is the central member of the management of the system. It stores the state of each storer (it knows the list of all of the fragments archived in the storers), it takes charge of detecting dead nodes, and activates reconstruction of fragments when storers disappear. In the prior art, the resources manager (24) is based on dedicated servers: management of the system is concentrated on the resources manager and thus it constitutes a weak spot in the architecture of the system because its central position makes it a preferred target for denial of service (DOS) attacks. The present invention proposes distributing the functions of the resources manager (24) over all of the clients (nodes) of the network in order to improve the resistance of the system to simultaneous failure (be it intentional or accidental) of a large number of peers. These distributed means store the state of each storer, they possess the list of all of the fragments archived in the storers, they take charge of detecting dead nodes, and they activate reconstruction of the fragments when that is necessary for preserving the data persistently.

Figure 3:
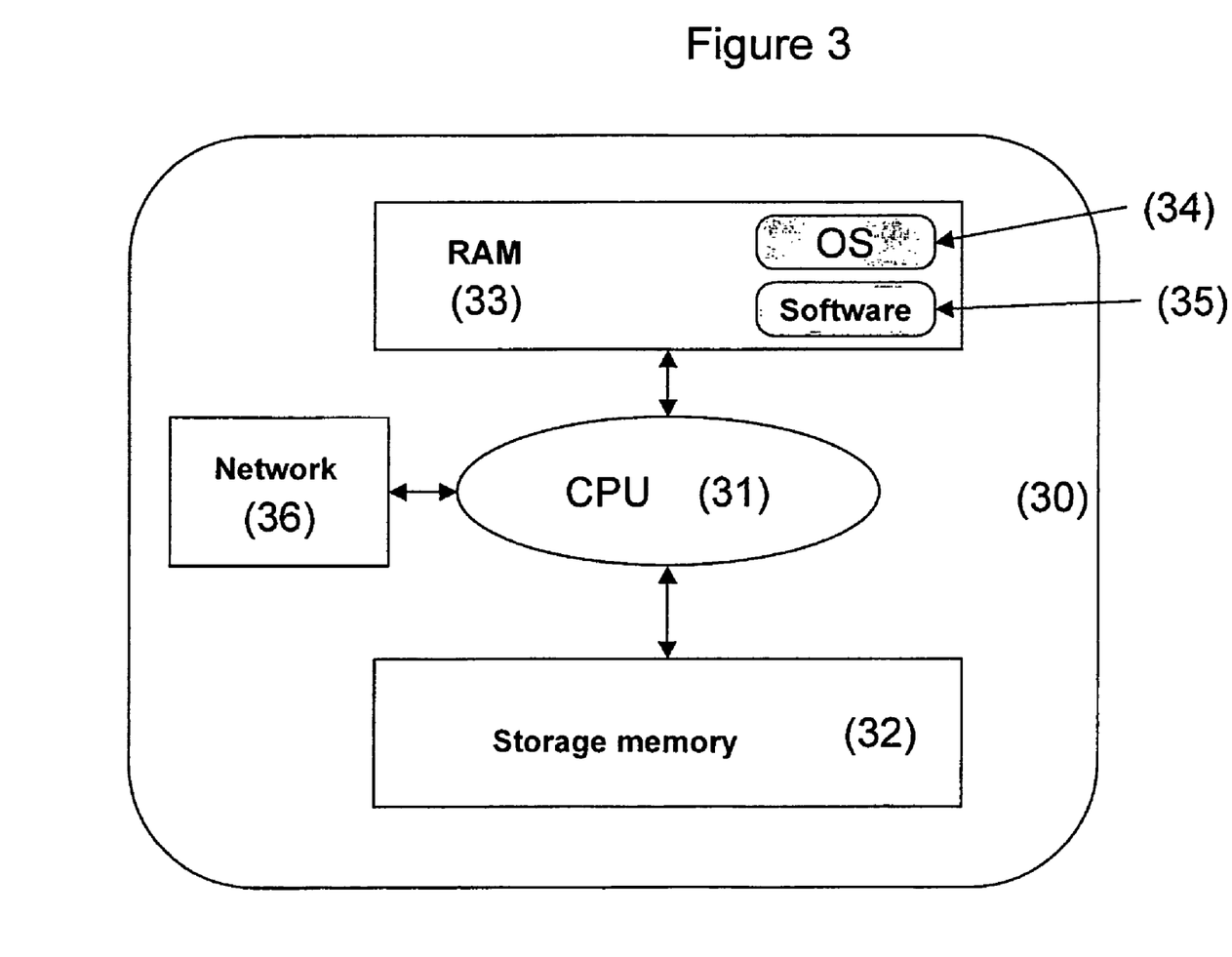
FIG. 3 shows the architecture of the distributed storage device.

In an embodiment shown in FIG. 3, the storage device (30) of the present invention comprises a processor (31) of the central processing unit (CPU) type controlling a memory (33) of the random access memory (RAM) type, a storage memory (32) of the hard disk type, and network connection means (36), e.g. of the network card type. An operating system (34) is executed on the processor and enables the above-mentioned applications (35) to be executed. For example, the component elements of the device can be constituted by a small-size and low-consumption mother card, with an x86 type processor, by a RAM, by a hard disk, and by a network card (e.g. a fast Ethernet card). All of these elements are incorporated into a small-size box. The box is connected to the local area corporate network and can thus access the networks of the other similar boxes (e.g. over the Internet) in order to provide the storage service. The device can be incorporated into an existing computer. In order to guarantee the security of the invention, the device can consist of an external box added to a node of the network, it being possible, depending on the chosen embodiment, for the box to use certain resources of the computer (e.g. the network connection).

The present invention proposes a mechanism making it possible to distribute the above-mentioned resources manager (24). This mechanism tends to entrust all of the resources management to the peers of the network. Novel architectures propose routing mechanisms for routing between the peers, which mechanisms are based on an overlay network, as well as resources management systems that are based on distributed hash tables (DHTs). As mentioned in the prior art, the use of DHTs for distributed storage offers replication of the data in order to guarantee failure tolerance.

In a DHT, the communications complexity is a function of the number of peers and of the data, which generates non-negligible extra cost in terms of communications in the network. In particular when the size of the data is considerable, which applies for a distributed backup network. That is why the DHT of the present invention is used only for storing meta-data items, which are much smaller in size than the items of data themselves. The term "meta-data" is used herein to mean check data for checking the distribution of the storage (data about the nodes, about the data fragments in each node, etc.). The DHT also acts as memory cache in order to increase the overall performance of the system.

Figure 4:
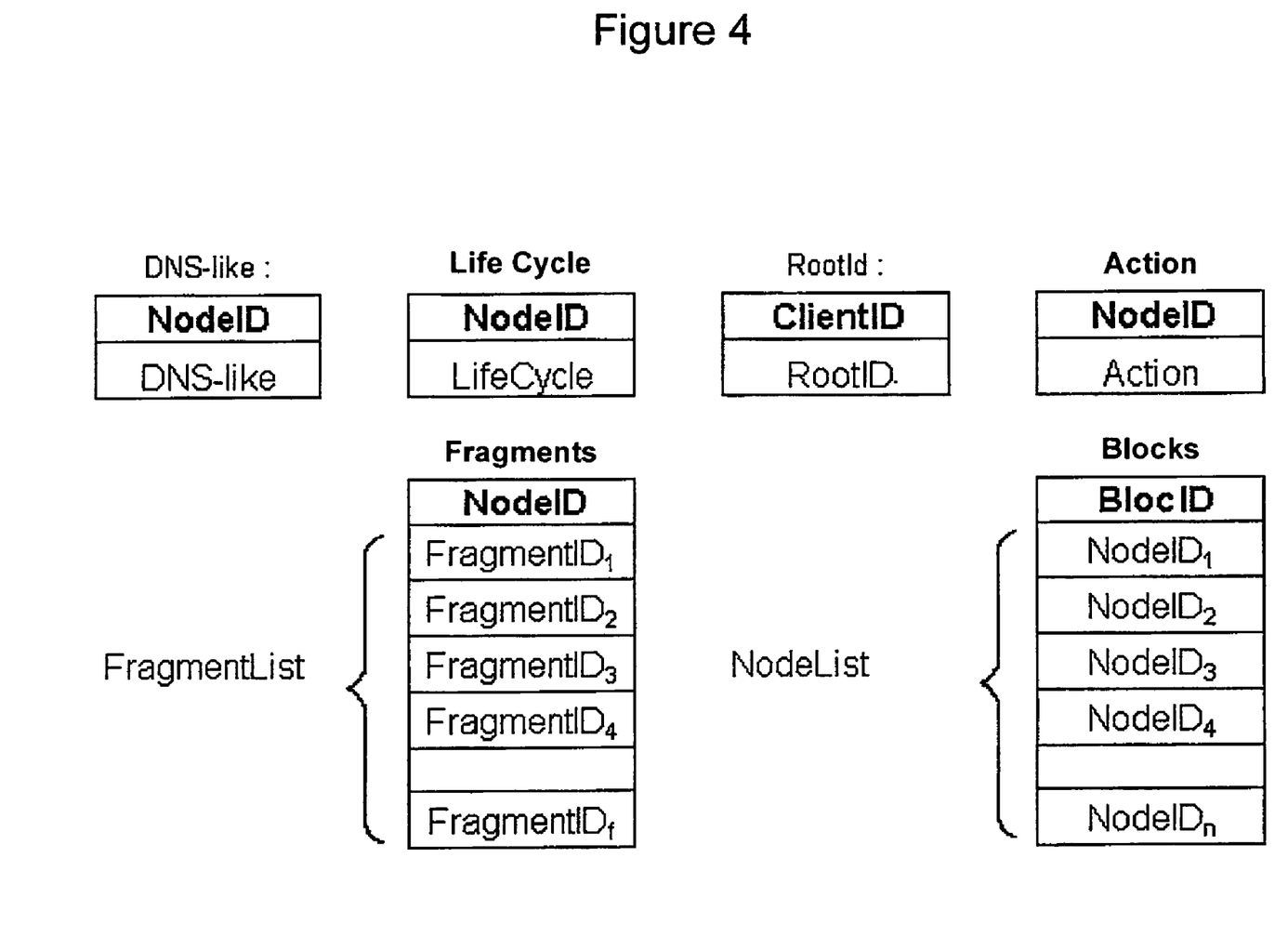
FIG. 4 shows an example of the structure of the distributed hash table.

As shown in FIG. 4, the distributed hash table has six objects:
DNSlike: this object links the NodeID (the node identifier) to the physical address (IP address) of each peer;
LifeCycle: each peer, represented by its NodeID, regularly stores a presence message, which message represents its life cycle;
RootID: during storage of a block, the client peer stores its RootID which represents the pointer to the root block that contains all of the information necessary for recovering all of the blocks of the client;
Action: the distributor stores the commands that have not yet been executed. In the event that the distributor fails, said distributor can always re-execute the commands pending; the most common example is erasure of the blocks: if the storers are not available, it is necessary to be able to re-execute the command subsequently;
Fragments: each storer stores the list of all of its fragments in a DHT; and
Blocks: on storing a block, the client peer stores the list of the NodeIDs of the nodes containing the fragments of the block identified by its BlockID (unique identifier of the block).

The purpose of the first four objects is to collect functional and behavioral information on the peers, while the last two objects concern storage of data on the various peers.

Figure 7:
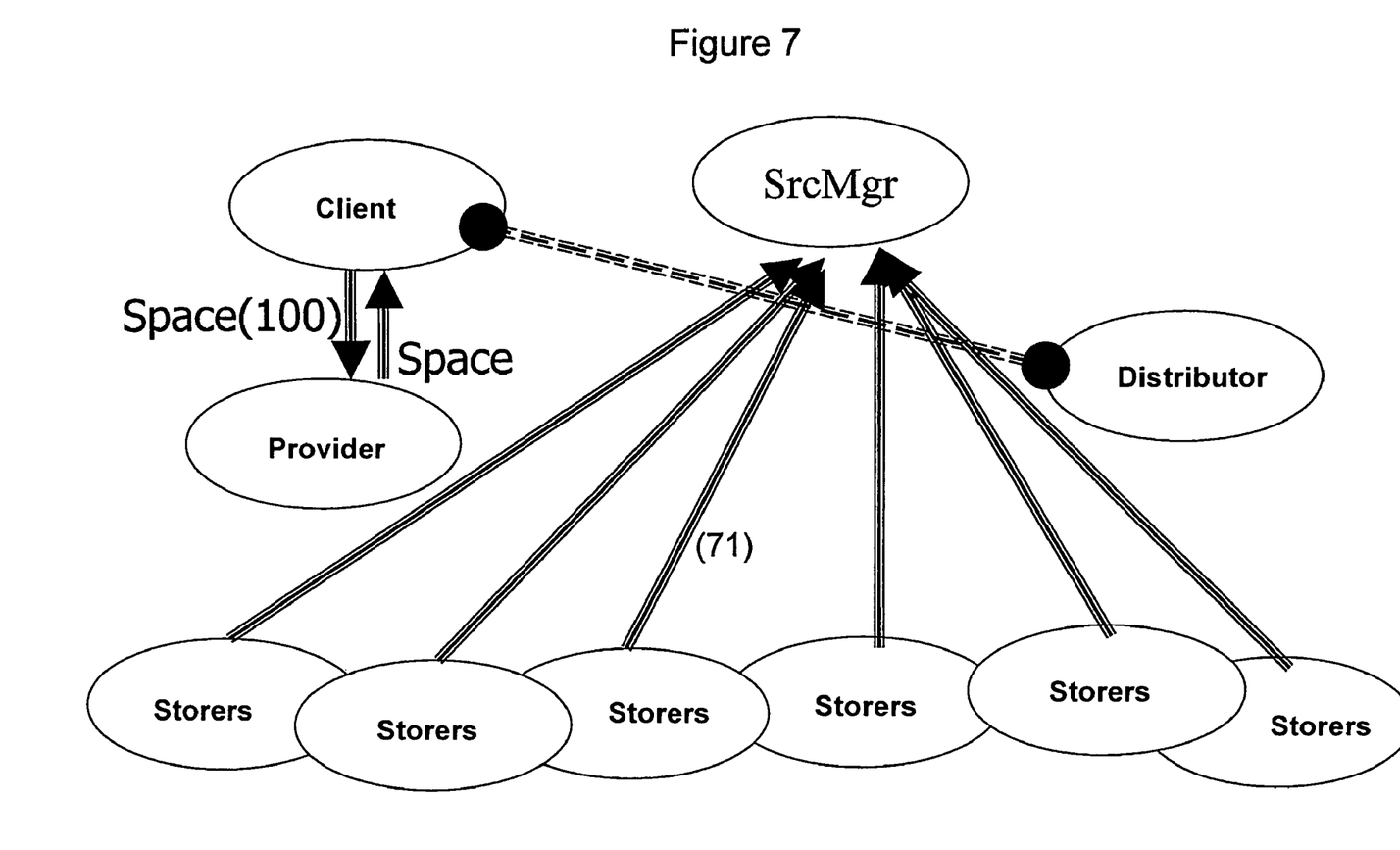
FIG. 7 shows the interchange between the various elements of the network during initialization of the network.

The various steps implemented in the present invention are as follows:

The initialization step when a new peer joins the network is shown in FIG. 7. Each client that is to serve as an input point to the overlay computes its NodeID as a function of a certain metric, e.g. as a function of its geo-location. This identifier is kept throughout the life of the peer. The peers are added one-by-one to the overlay. Each peer that is about to be incorporated into the network computes a unique NodeID. The peers contact the input point that is numerically closest in the list that it knows, and inserts itself as a function of its NodeID in the overlay, and reconstructs its own routing table by means of its neighbors. At the birth of a peer, in addition to its unique identifier, the NodeID, the peer obtains a list of BlockIDs. The various nodes of the network update (71) the resources manager, i.e. the DHT.

The maintenance step which consists in each peer storing or updating in the DHT its DNSlike object which contains the information concerning the association of its NodeID with its IP, and its life cycle. In this way, in order to determine when a peer is disconnected or if it has failed, it suffices to read the DHT. Given that it is possible to recover the list of fragments that a peer possesses, it is always possible to reconstruct the fragments lost by the loss of a peer.

Figure 8:
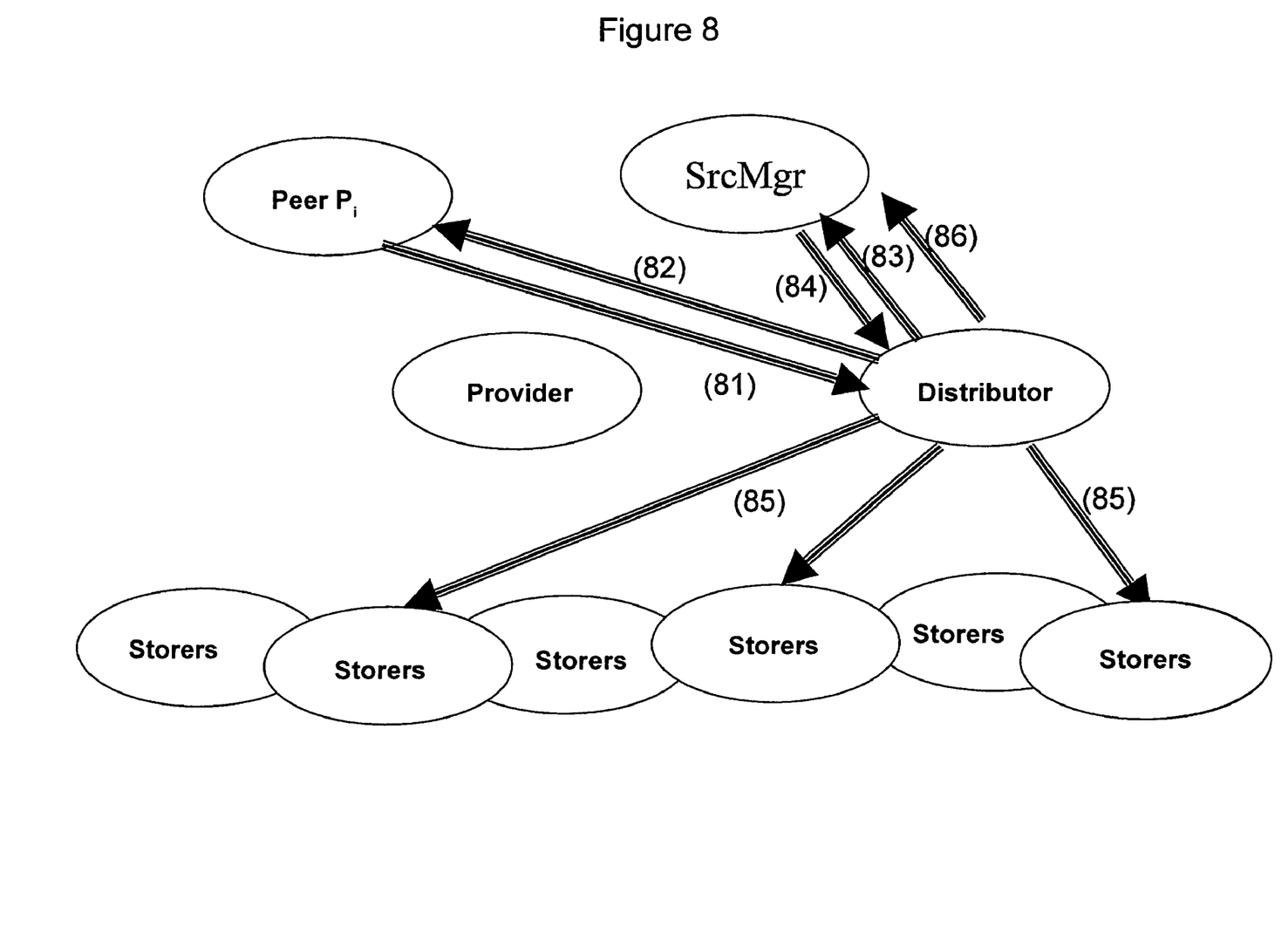
FIG. 8 shows the interchange during writing (backup) of data in the network in accordance with the present invention.

The step of storing a block is shown in FIG. 8: a peer $P_i$ wishes to store a block $B_i$.

Figure 5:
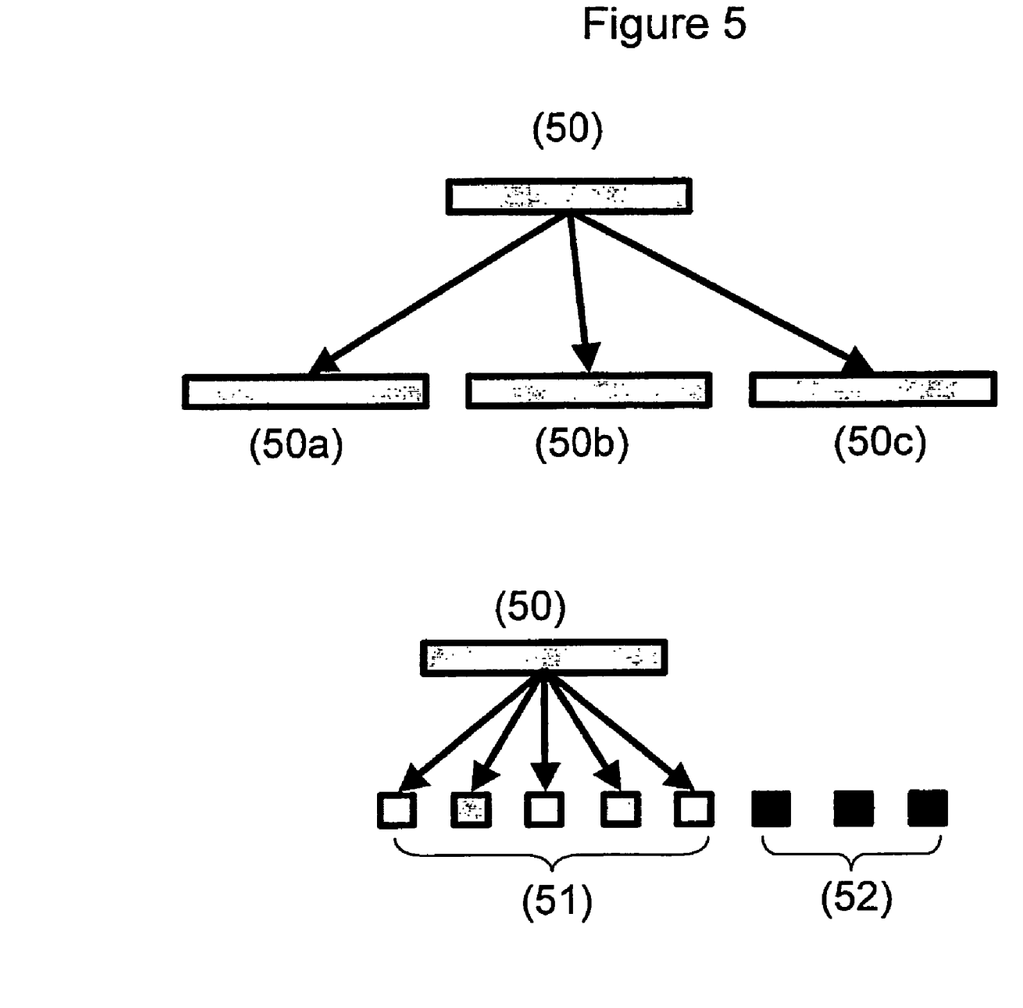
FIG. 5 shows replication and subdivision of a block of data prior to distributed storage.

As shown by FIG. 5, the block to be stored (50) can be replicated as a plurality of blocks (50a, 50b, and 50c) in order to allow for a tolerance to failures (in this example, two blocks can be lost without the data being degraded). It computes a virtual group number as a function of the BlockID. Then the peer $P_i$ obtains by the DHT the list of the NodeIDs of the storers corresponding to the virtual group $GV_i=\{P_i; \ldots ;P_f\}$. A virtual group is a set of f peers selected so as to minimize the simultaneous death correlation. In more detailed manner:

Client: the client peer $P_i$ sends a block $B_i$ to a distributor (81).

Distributor: the distributor subdivides the received block (50) $B_i$ into f fragments: s segmentation fragments (51) and r redundancy fragments (52) (e.g. Reed-Solomon redundancy), as shown in FIG. 5. Then, the distributor sends a search request (83) for searching for a peer, from $P_1$ to $P_f$. The NodeIDs obtained (84) serve to make up the virtual group associated with storage of the block $B_i$. The distributor stores (85) the fragments in the indicated peers, referred to as "storers".

Storer: it stores the fragments coming from various blocks. Each of the storers updates its list of fragments and communicates it to the DHT. Each storer sends an acknowledgement to the distributor when a fragment is received.

Distributor: after validation of the preceding operations by acknowledgements, the distributor stores (86) in a DHT, with the BlockID of as key, the NodeIDs corresponding to the storers storing the BlockIDs. Finally, the distributor informs (82) the client that its block $B_i$ has been stored successfully by sending an acknowledgement.

Figure 9:
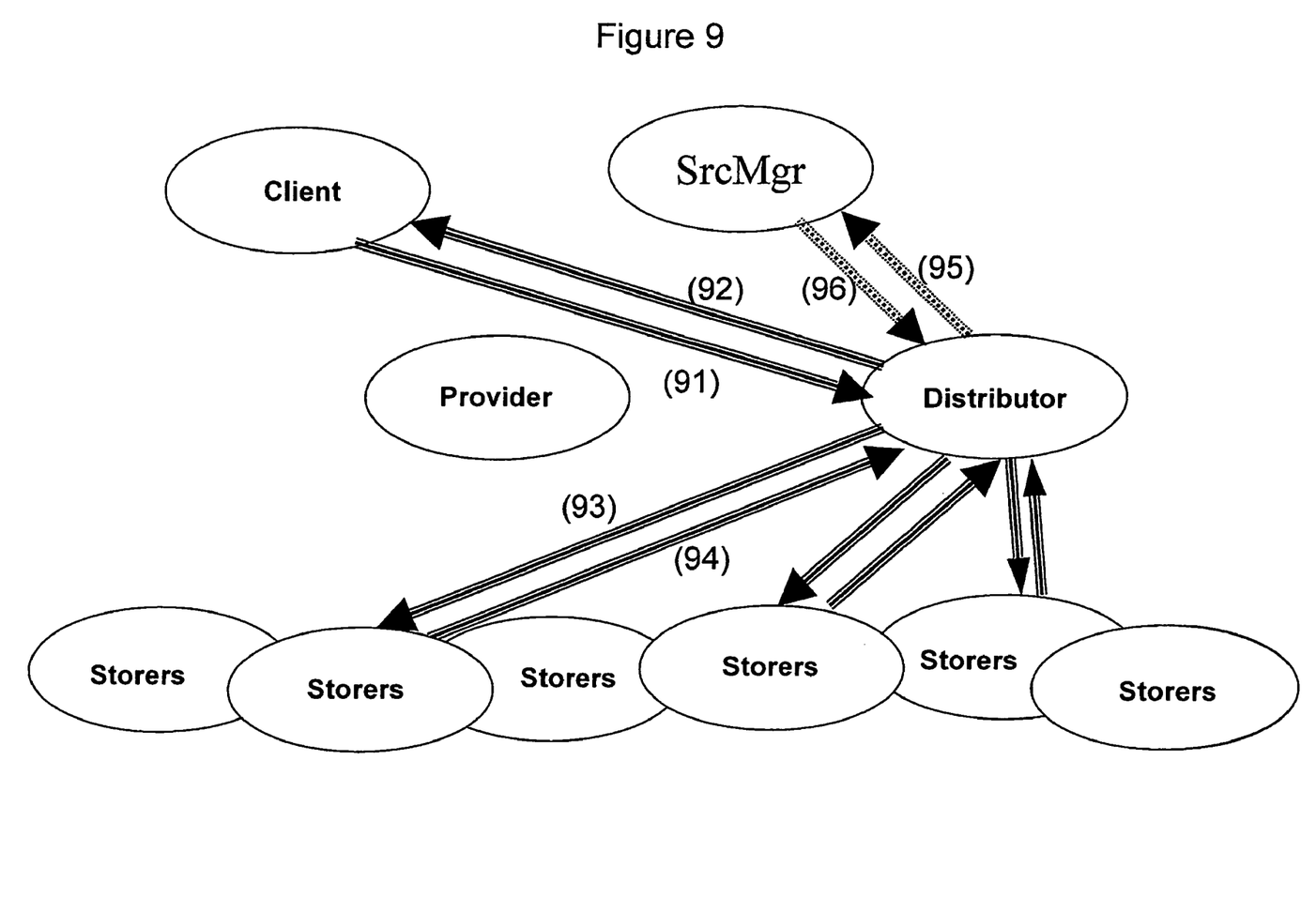
FIG. 9 shows the interchange during the data retrieval step in the network.

The step of recovering/receiving a block is shown in FIG. 9: a peer $P_i$ wishes to receive its previously stored block $B_i$. The action takes places as follows:

Client: the client peer sends a request (91) to receive the block $B_i$ to the distributor.

Distributor: the distributor sends a request to the DHT (95) for requesting the corresponding BlockID, the DHT sends back to it (96) the list of the NodeIDs storing the fragments making up the blocks.

The distributor then interrogates the DHT to find out the IPs of the storers as a function of the given NodeIDs. The distributor requests the fragments from the storers corresponding to the NodeIDs provided:

Storer: at the request of the distributor (93) it sends (94) the stored fragment.

Distributor: once the distributor has received s fragments from among the s+r fragments, the fragments are then used to reconstruct the block $B_i$. The distributor sends the block $B_i$ to the client (92).

Figure 6:
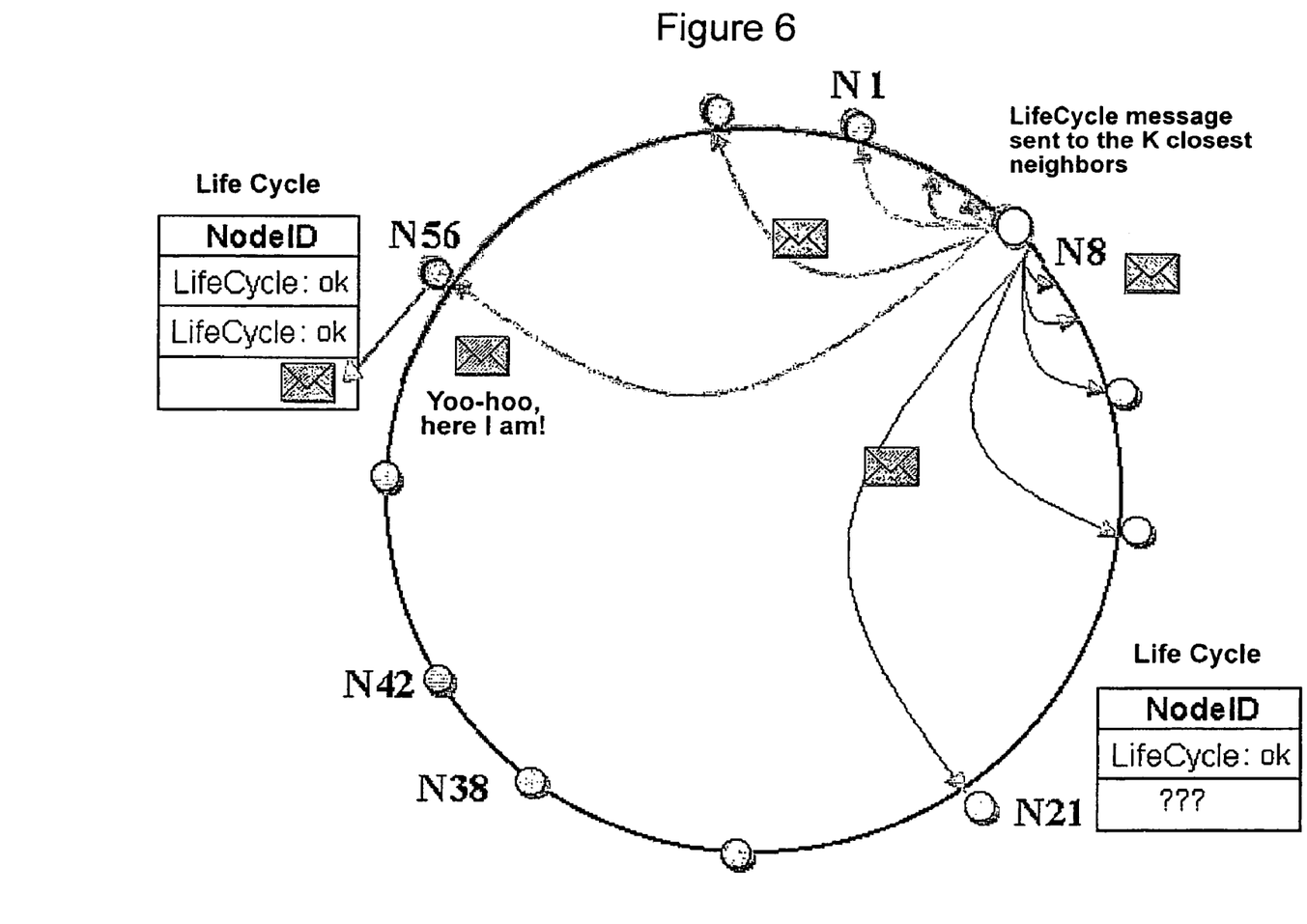
FIG. 6 shows how the peers of the network are monitored by the DHT being updated dynamically by each peer.

The present invention also relates to the mechanisms making it possible to monitor continuously the state of the network and of the peers, and, when necessary, to reconstruct data lost due to failure of one or more elements of the network. Monitoring the peers is always based on the DHT, and more precisely on the LifeCycle object of each of the peers, as shown by FIG. 6. The DHT puts in place the method of duplicating the check data whereby a plurality of peers receive the life cycle. The peer regularly sends its life cycle to peers selected by the DHT which, as a result, monitors the activity of said peer.

Failures are detected in the following manner: each peer, e.g. N8, communicates at regular intervals to the DHT a message that feeds the LifeCycle of the peer in the DHT. That object is sent as a function of the NodeID of the peer to the nearest neighbors (N1, N21, N56, etc.) of the peer NodeID N8 (e.g. the nearest neighbors are those whose NodeIDs are closest to the NodeID of the peer N8). If the peer has not failed, the object concerning its life cycle finds itself stored in said peer and in the k-1 peers that are numerically closest to its NodeID, by the data replication mechanisms inherent to the DHT (k is a parameter that makes it possible to set the failure tolerance of k-1 elements). We should note that, if the peer disconnects in software terms, an update of its life cycle is sent before said peer is actually disconnected. Thus, the k-1 peers can analyze in the local DHT (without communication), the state of the life cycle of the given peer. In this way, each peer reads the life cycle of the other peers associated by routing within the DHT.

When a peer N21 detects an anomaly concerning the life cycle of the peer N8 (absence of the latest update), it refers the matter to the k-1 other peers designated by the overlay. The peer N21 goes into a phase of consultation with the k-1 peers, and, as a function of the information that is communicated to it, the peer that initiated the request either triggers or does not trigger reconstruction of the "lost" data of the node N8. This consultation step can be performed by a "Byzantine Generals" algorithm so as to cope with malevolent peers in decision-taking. A plurality of phases of total information interchange are implemented between the peers, in which phases each of the peers communicates its opinion on the failure of the peer in question. The multiple phases make it possible to detect the inconsistent peers and to make the correct decision with a certain level of guarantee: the most well known algorithms tolerate up to malevolence of at the most one third of the peers. If reconstruction is requested even though it is unnecessary, then that is not prejudicial to the system. However, it is then necessary to accommodate the fact that detection is not reliable, by constantly monitoring the reconstruction process.

Figure 10:
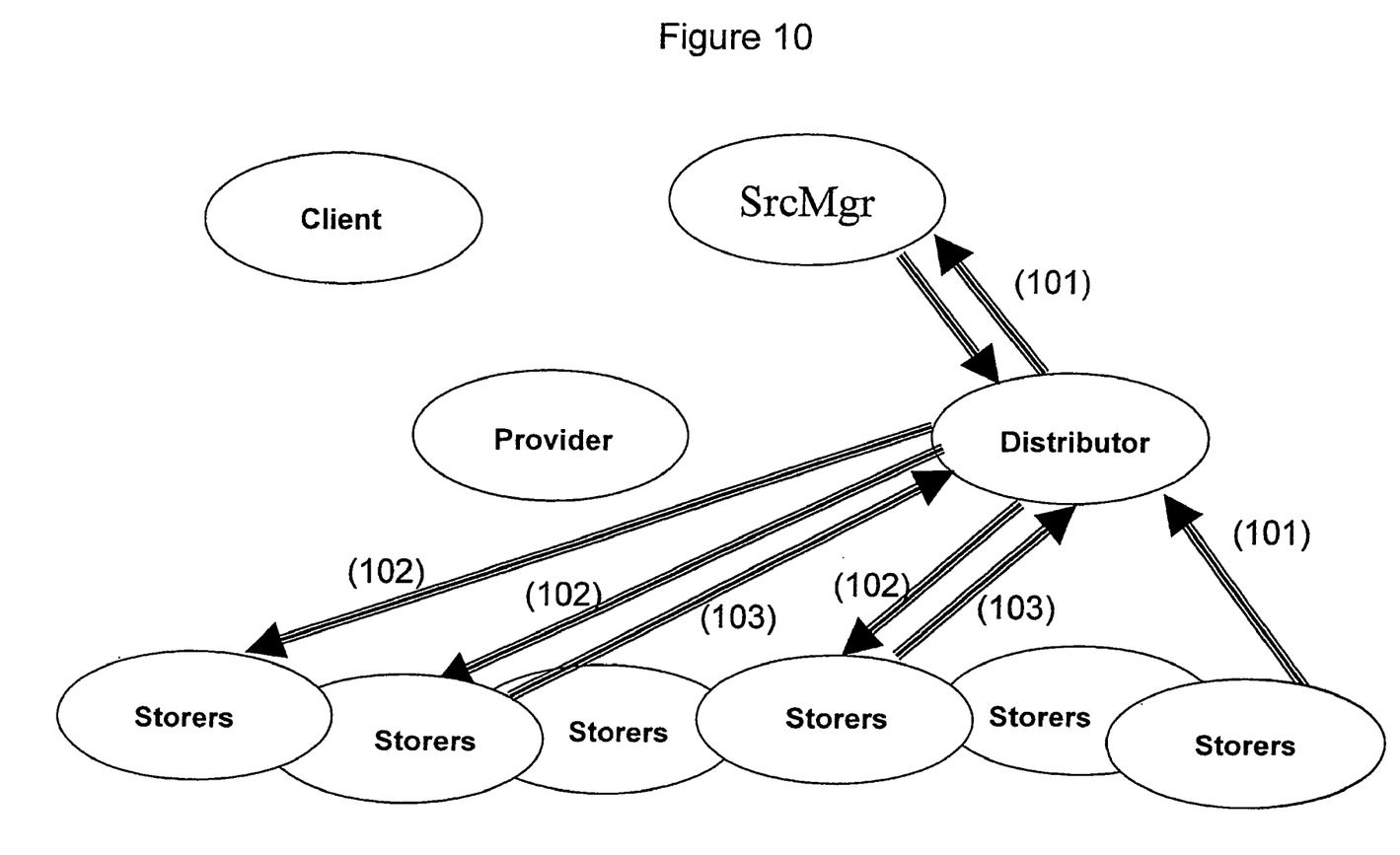
FIG. 10 shows the interchange between the various elements of the network during reconstruction of "lost" data from a failed peer.

As shown in FIG. 10, the reconstruction of the "lost" data of the failed peer N8 is triggered by the peer N21 that has detected the failure. N21 requests (101) from the DHT the fragments that the failed peer N8 stored. In an implementation of the invention, the routing and naming mechanisms enable the peer itself to posses a portion of the information specific to the data that it contains and that its near neighbors contain. Thus, it is possible for this operation not to need any communication, and to require merely consultation of the DHT.

The search is performed as a function of the NodeID of the failed peer. A request (102) is then launched to recover said fragments. Once the list of the fragments has been recovered (103), the peer deducts all of the damaged blocks and requests reconstruction of the lost fragments. Said fragments are reconstructed by means of the redundancy mechanism, and they are stored in peers selected using the same method as for the initial storage of the block. Once the operation is finished, the peer updates the list of the NodeIDs for the BlockID, in the DHT.

The present invention also implements ancillary mechanisms making it possible to increase the security of the system. Among such mechanisms, making communications between peers secure concerns:

- the connection of (new) peers to the network that is based on a list of trustworthy nodes that are the dedicated servers;
- the identification of peers in order to prevent a malevolent node from connecting to the network; this identification is based on public-key authentication systems; and
- the confidentiality of the transactions that implements encryption (enciphering, scrambling, transposition) of the transaction data between the peers by the use of an encrypted secret key by the public key of the peer.

The invention claimed is:

1. A method for the distributed backup of a block B of digital data in a computer network including a distributed hash table DHT and at least three nodes NO, the nodes NO being connected to said network, said method comprising a subdivision step using a processor programmed to subdivide said block B into r fragments F of digital data, said method further comprising:
    a storage step using a processor programmed to store a fragment F in the storage resources of a node $NO_F$; and
    a recording step using a processor programmed to record data entry pairs having the form of (block B, node $NO_F$) and (node $NO_F$, fragment F) in the portions of the DHT that are contained in at least two nodes;
    wherein no operation on the DHT or any storage operation is implemented on a centralized server, and
    further comprising after the subdivision step, computing s redundancy fragments computed on the basis of said r fragments F where s is greater than one.

2. The method for distributed backup according to claim 1, further comprising storing said fragments, during the storage step, in nodes that are all different.

3. The method for distributed backup according to claim 1, wherein the DHT contains check data only, and no fragment of data.

4. The method for distributed backup according to claim 1, further comprising a periodic sending step where each of said nodes periodically sends activity information to a set of nodes selected by the DHT.

5. The method for distributed backup according to claim 1, wherein the DHT contains a "life cycle" field, the method further comprising sending activity information updates the "life cycle" field of said node, said field being present in every one of the nodes selected by the DHT.

6. The method for distributed backup according to claim 1, further comprising a detection step detecting a "life cycle" field that is not updated by a node $C_{failed}$.

7. The method for distributed backup according to claim 1, further comprising a reconstruction step reconstructing the data stored in said failed node $C_{failed}$ and for updating, in the DHT, the list of the nodes storing at least one fragment of said block B.

8. The method for distributed backup according to claim 1, wherein each of the fragments reconstructed during said reconstruction step is stored in at least one other healthy node.

9. The method for distributed backup according to claim 1, further comprising a recovery step recovering said block B.

10. The method for distributed backup according to claim 9, wherein said recovery step comprises a first step of sending a request from the requesting node to the DHT, a second step in which the DHT sends back to it the nodes that are storing the fragments of the block, a step of sending a request for recovering fragments to said nodes, and a step of reconstructing the block B as of reception of F different fragments.

11. A distributed data backup device comprising a processor, a storage memory, connection means for connecting to the network, and means for controlling the distributed data, of a distributed hash table DHT type, and wherein the processor is programmed to perform the method steps recited in claim 1.

12. The distributed backup device according to claim 11, wherein the device is in the form of an external box that is added to an existing computer workstation.

13. The distributed backup device according to claim 11, further comprising at least two of the devices connected together via a computer network.

14. The distributed backup device according to claim 11, further comprising a plurality of the devices connected to a plurality of interconnected networks.

* * * * *